US008306688B2

(12) United States Patent
Nagata et al.

(10) Patent No.: US 8,306,688 B2
(45) Date of Patent: Nov. 6, 2012

(54) ELECTRONIC CONTROL DEVICE

(75) Inventors: Kouji Nagata, Nagoya (JP); Kaname Kura, Kariya (JP)

(73) Assignee: Denso Corporation, Kariya (JP)

( * ) Notice: Subject to any disclaimer, the term of this patent is extended or adjusted under 35 U.S.C. 154(b) by 451 days.

(21) Appl. No.: 12/496,758

(22) Filed: Jul. 2, 2009

(65) Prior Publication Data

US 2010/0004814 A1 Jan. 7, 2010

(30) Foreign Application Priority Data

Jul. 4, 2008 (JP) ................................ 2008-175993

(51) Int. Cl.
*G06F 7/00* (2006.01)
*G06F 7/10* (2006.01)
*F02D 41/22* (2006.01)
*F02D 41/26* (2006.01)

(52) U.S. Cl. ..................... 701/33.2; 701/29.1; 701/32.7; 701/33.4

(58) Field of Classification Search ........ 701/29.1–34.4, 701/99–115; 715/23, 25, 30–31
See application file for complete search history.

(56) References Cited

U.S. PATENT DOCUMENTS 7,239,946 B2 * 7/2007 Sowa .............................. 701/29
7,788,005 B2 * 8/2010 Enomoto et al. ................ 701/29
2006/0089767 A1 * 4/2006 Sowa .............................. 701/29
2008/0221751 A1 9/2008 Fink et al.
2009/0037044 A1 * 2/2009 Enomoto et al. ................ 701/33
2009/0076681 A1 * 3/2009 Yasue et al. ...................... 701/35

FOREIGN PATENT DOCUMENTS

JP 7-218391 8/1995
JP 11-141391 5/1999
JP 3960212 5/2007

OTHER PUBLICATIONS

Title 13, California Code Regulations, Section 1968.2, Malfunction and Diagnostic System Requirements for 2004 and Subsequent Model-Year Passenger Cars, Light-Duty Trucks, and Medium-Duty Vehicles and Engines (OBD II), No date, pp. i-iii and 1-138.

* cited by examiner

*Primary Examiner* — Khoi Tran
*Assistant Examiner* — Dale Moyer
(74) *Attorney, Agent, or Firm* — Nixon & Vanderhye P.C.

(57) ABSTRACT

An electronic control unit performs a process that stores into a buffer selected diagnostic trouble codes (DTC) currently in a volatile trouble code storage by selecting, from among multiple codes, a code that is to be saved in an EEPROM, when an ignition switch of a vehicle is turned off. Further, the DTC stored in the buffer is written in the EEPROM. If the electronic control unit receives, from a scan tool, a command that instructs erasure of the DTC in the volatile trouble code storage, the above-described process is performed before erasing the DTC from the volatile trouble code storage.

10 Claims, 6 Drawing Sheets

ELECTRONIC CONTROL DEVICE

CROSS REFERENCE TO RELATED APPLICATION

The present application is based on and claims the benefit of priority of Japanese Patent Application No. 2008-175993, filed on Jul. 4, 2008, the disclosure of which are incorporated herein by reference.

FIELD OF THE INVENTION

The present disclosure generally relates to an electronic control device for use in a vehicle, the device that controls storage of a trouble code in a non-volatile memory that is rewritable based on a diagnosis result.

BACKGROUND INFORMATION

Conventionally, an electronic control device, or, customary called as an electronic control unit (ECU) in the automotive industry, installed in a vehicle for controlling vehicular mechanism such as an engine or the like has a capability for storing a trouble code that is indicative of a trouble of the mechanism based on diagnosis results derived from signals from various sensors. The trouble code, or a so-called diagnostic trouble code (DTC) or a Fault Code, is usually stored in a memory.

The DTC stored in a memory of the ECU is regulated in California by law in the following manner.

The regulation in California is provided by California Air Resources Board (CARB) as ODB2. The regulation includes the following rule. That is, (a) DTC should be configured to be stored as a permanent fault code (or a Permanent Diagnostic Trouble Code) that is not erased even when a power supply is cut off, and the PDTC should be stored in a period between an occurrence of a trouble and a shut-down of the ECU (stoppage of the operation of the ECU) in association with the turning-off of the ignition key.

To comply with the regulation, the ECU controls the DTC to be stored, as a PDTC, in a rewritable non-volatile memory such as an EEPROM or the like.

Further, the above regulation has the following rules (b) to (e). That is, (b) PDTC should not be erased by a command that is transmitted from an outside tool that communicates with the ECU.

(c) The number of PDTCs stored in the memory is at least four.

(d) Normal diagnosis in three successive driving cycles may lead to the erasure of the PDTC by the ECU itself. In this case, the driving cycle is a period between a turning-on of an engine and a next turning-on of the engine having a stoppage of the engine interposed therebetween. The driving cycle can be abbreviated as DCY. The normal diagnosis in 3DCYs means that all of the three diagnoses in three successive DCY are normal.

(e) The normal diagnosis after a data clearance in a volatile memory by the removal of a battery from the vehicle may lead to the erasure of the PDTC by the ECU itself.

The data writing in the EEPROM may have the following two concerns. That is, (a) the data writing time in the EEPROM is longer than the other memory such as a RAM or the like, thereby making it difficult to perform the data writing process when the process load of the microcomputer is heavy, and (b) the data writing may be faulty if the voltage of the power supply is not stable. That is, when the power supply is suffering from noise, or when the power supply is suffering from power surge, the data writing may lead to a fault data.

Therefore, the data that should not be lost is written in the EEPROM under the control of the ECU in the following manner. That is, for safe data writing, the ECU is equipped with a power control circuit that controls the operation voltage from the power supply for a microcomputer in the ECU to be maintained until the power shut-down is allowed after completion of the all processes in the microcomputer even when the ignition switch is turned-off. In this manner, after turning-off of the ignition switch, the data in the RAM to be saved is written in the EEPROM. See Japanese patent documents JP-A-H11-141391 and JP3960212. When the ignition switch is turned off, the engine is stopped, thereby making it possible to lighten the processing load of the microcomputer as well as to stabilize the operation voltage of the power supply without suffering from a noise, a surge or the like.

In the ECU, the DTC detected during a wake-up mode of the ECU that is turned on at a certain timing of the ignition switch turned-off period, or during the ignition switch turning-on period can be stored as the PDTC in the EEPROM in the following manner.

That is, when a trouble is detected upon starting the power supply for the ECU, the DTC indicative of the detected trouble is stored in the RAM first, and, after turning-off of the ignition switch, the DTC stored in the RAM is selectively written to the EEPROM by examining whether each of the DTC data fulfills the storage criteria and selecting the criteria-fulfilling DTC data.

Further, the ECU for use in a vehicle is generally configured to perform a process is instructed in a command (a request for performing a process) that is transmitted from an external tool. (See the above patent document JP3960212).

In the above patent document JP3960212, a problem that is inherent in the storage mechanism is described. That is, the problematic situation is, After the latest value of a permanent storage data is retrieved to an external device from a work memory, the latest value of the permanent storage data in the work memory is lost for some reason before a storage of the latest value in the rewritable non-volatile memory, and then a current value in the rewritable non-volatile memory is copied to the work memory upon fulfillment of the data recovery criteria prior to the second retrieval of the permanent storage data in the work memory by the external device. The retrieved data for the second time by the external device may possibly have an older value that is older than the data retrieved for the first time. In view of the above problem, the permanent storage data in the work memory is configured to be stored in the rewritable non-volatile memory even when an output request is received from the external device for outputting the permanent storage data, according to the disclosure in the above patent document.

The ECU that saves, as a PDTC, the DTC to the EEPROM after turning off of the ignition switch if the DTC is detected as a result of the diagnosis during the operation of the ECU due to the power supply may have a problem in case that the ECU receives a command, from the external tool, that leads to the erasure of the OTC in the RAM (i.e., a command that requests the erasure of the DTC). That is, in the above-described case, the DTC detected in the current period of the turning-on of the ignition switch cannot be stored as the PDTC in the EEPROM, due to the fact that the DTC in the RAM is erased at the time of the turning-off of the ignition switch.

For example, the situation may be interpreted as, if a vehicle is brought to a dealership by a user upon recognizing an operation of a warning lamp (MIL) that is caused by the detection of a trouble, the DTC is retrieved from the RAM of the ECU and then erased by the external tool under control of the mechanics in the dealership, the DTC in the RAM cannot be stored as the PDTC in the EEPROM in case that erasure of the DTC is performed without turning-off of the ignition switch of the vehicle.

SUMMARY OF THE INVENTION

In view of the above and other problems, the present disclosure provides an ECU, which is configured to preserve, to a rewritable non-volatile memory after turning-off of the ignition switch, trouble information stored in a trouble information storage during an operation of the ECU due to the power supply from a power source, is enabled to preserve the trouble information to the rewritable non-volatile memory even when the ECU receives a command or a request that leads to the erasure of the trouble information in the trouble information storage.

In an aspect of the present disclosure, the electronic control unit performs a diagnosis by using a diagnosis unit while the power supply is provided for its operation, and stores a trouble code indicative of a trouble detected by the diagnosis.

Further, an information selection unit selects and saves to a buffer, from among multiple pieces of trouble information, trouble information that fulfills a save criterion that defines information to be saved to a rewritable non-volatile memory.

Then, after turning off of the ignition switch, a trouble information preservation unit controls the information selection unit, and writes the trouble information in the rewritable non-volatile memory.

Therefore, from among the trouble information stored in the trouble information storage while the ECU is in operation, the trouble information to be saved in the rewritable non-volatile memory (information fulfilling a save criterion) is written in the rewritable non-volatile memory after turning off of the ignition switch.

In this case, the save criterion is, for example, that the information is not yet saved in the rewritable non-volatile memory. Further, the criterion may be that, assuming that the maximum number of storage areas in the memory is predetermined and the number of vacancy of storage areas is N, the information is within a scope of the first/last N th pieces detected by the diagnosis and is not yet saved in the rewritable non-volatile memory. Furthermore, the criterion may be that the information is the one being stored in the trouble information storage. That is, in other words, all the information stored in the trouble information storage is saved in the rewritable non-volatile memory.

In addition, the electronic control unit is configured to operate the information selection unit before performing the operation instructed by a specific command, when the specific command from the external device is indicative of a process that leads to the erasure of the trouble information in the trouble information storage. The electronic control unit otherwise performs the process instructed in a command from the external device without performing any pre-process.

Therefore, the electronic control unit preserves, in the buffer, the trouble information, from among the information being stored in the trouble information storage at the moment, that should be saved in the rewritable non-volatile memory due to the operation of the information selection unit when the specific command is transmitted from the external device. Therefore, if the trouble information is not in the trouble information storage (that is, if the trouble information has already been erased) when the ignition switch is turned off thereafter, the buffer has the corresponding information stored therein, thereby enabling the preservation of the trouble information from the buffer to the rewritable non-volatile memory. As a result, even when the specific command is transmitted from the external device to the ECU for instructing the erasure of the trouble information in the trouble information storage, the trouble information can be saved to the rewritable non-volatile memory. In this case, the buffer may be a device not erasing the memory contents even when the process instructed by the specific command is performed, or, in other words, the specific command may be a command not erasing the data in the buffer by the process included therein.

In another aspect of the disclosure, the electronic control unit performs the diagnosis, while it is operated by the power supply, for at least one diagnosis item, and stores the trouble information detected by the diagnosis to the trouble information storage. Then, the information selection unit selectively saves the trouble information fulfilling the save criterion from among the information in the trouble information storage. The information meeting the criterion is saved to the rewritable non-volatile memory.

Therefore, the electronic control unit saves the trouble information to the rewritable non-volatile memory after turning off of the ignition switch if the information stored in the trouble information storage fulfills the save criterion. For the example of the save criterion, please refer to the above description.

If a specific command instructing the erasure of the trouble information in the trouble information storage is transmitted from the external device, while performing the process included in a command, the ECU at least saves the trouble information existing in the trouble information storage to a record unit that does not allow the erasure of its contents by the process instructed in the specific command before performing the process.

Therefore, even when the trouble information in the trouble information storage is erased by the reception of the specific command, the trouble information to be stored in the rewritable non-volatile memory is saved in the record unit. Therefore, the trouble information to be stored to the rewritable non-volatile memory can be stored, after turning off of the ignition switch for example, from the record unit to the rewritable non-volatile memory. In this case, if the trouble information recorded in the record unit is restricted to the information fulfilling the save criterion, the information in the trouble information storage can be entirely stored to the rewritable non-volatile memory. In addition, if the record unit is configured to store all of the trouble information in the trouble information storage, the trouble information meeting the save criterion is selectively stored from the record unit to the rewritable non-volatile memory.

Therefore, the trouble information can be stored to the rewritable non-volatile memory from the trouble information storage even when, from the external device, the specific command instructing the erasure of the trouble information in the trouble information storage is transmitted to the ECU.

In yet another aspect of the disclosure, the trouble information in the trouble information storage of the electronic control unit is stored to the rewritable non-volatile memory, for at least one diagnosis item, after the turning-off of the ignition switch, thereby enabling the same effects achieved by the above-described aspect.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described in the following.

First Embodiment

Figure 1:
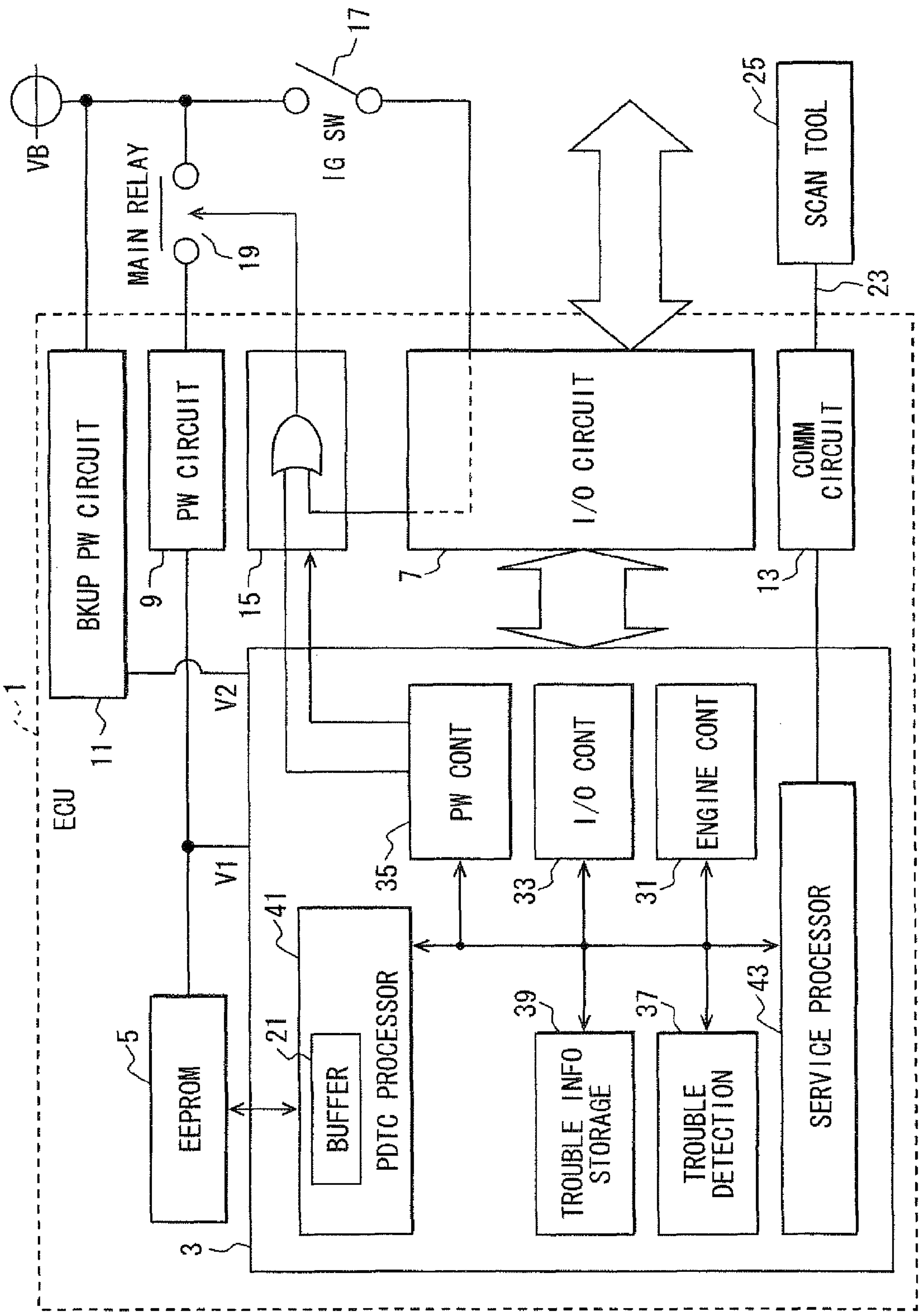
FIG. 1 is a block diagram of an electronic control unit in an embodiment of the present disclosure.

FIG. 1 is a schematic diagram which shows the structure of an ECU 1 in the first embodiment. The ECU 1 of the present embodiment is disposed on a vehicle for controlling an engine of the vehicle.

The ECU 1 is, as shown in FIG. 1, has a microcomputer 3, an EEPROM 5 that is re-writable and non-volatile, an input/output circuit 7, a power circuit 9, a backup power circuit 11, a communication circuit 13 and a main relay drive circuit 15.

The microcomputer 3 receives inputs (i.e., information) from various sensors. That is, signals from an intake-pipe pressure sensor, signals from an engine temperature sensor, signals from a vehicle speed sensor, and signals from an ignition switch 17 having a battery voltage VB after tuning-on of the switch 17 are input through the input/output circuit 7. Further, the input/output circuit 7 outputs drive signals, to electric loads such as an ignition device, an injector, a warning lamp (MIL) and the like, according to the instruction from the microcomputer 3.

Then, the microcomputer 3 controls the electric loads that relate to engine control by performing control calculation based on various inputs through the input/output circuit 7 and by providing instruction for the input/output circuit 7 based on the calculation results. For example, the microcomputer 3 calculates valve opening timing and valve open duration of the injector, and, based on the calculation result, controls the fuel injection for the engine by providing for the input/output circuit 7 an instruction for driving the injector.

As the power source of the ECU 1, there are two power sources, that is, a operation power source with the battery voltage that is provided from the battery on the vehicle through the main relay 19 and a regular power source with the battery voltage that is provided from the same battery continuously without interruption.

The main relay 19 is turned on by the main relay drive circuit 15 in the ECU 1. In other words, the drive circuit 15 turns on the main relay 19 by supplying electric current for a coil (not shown in the drawing) in the main relay 19 when at least one of an ignition switch signal and a main relay drive signal from the microcomputer 3 has a high voltage. In this case, the high voltage of the ignition switch signal means that the voltage takes a battery voltage value VB according to the turning-on of the ignition switch 17. Further, the main relay drive circuit 19 has a function that turns off the main relay 19 only for a predetermined time when the main relay drive circuit 15 receives a compulsive blocking-off signal from the microcomputer 3 even if the ignition switch signal is high.

Then, in the ECU 1, the power circuit 9 generates and outputs an operation voltage V1 having a constant value (e.g., 5 V) for the operation of the microcomputer 3 from the operation power source when the power source is connected by the turn-on of the main relay 19. The operation voltage V1 is provided not only for the microcomputer 3 but also, for example, for the EEPROM 5.

Therefore, the main relay 19 is turned on by the main relay drive circuit 15 and the operation voltage V1 is provided for the microcomputer 3 and the EEPROM 5 to start the operation of the microcomputer 3 when the ignition switch 17 is turned on in the ECU 1 and the ignition switch signal becomes high. In this case, the start of the operation of the microcomputer 3 is identical with the start of the operation of the ECU 1. Further, the power circuit 9 has a so-called "power-on reset feature" to reset the microcomputer 3 until the operation voltage V1 becomes stable after the start of the output of operation voltage V1.

Then, when the microcomputer 3 begins its operation, the microcomputer 3 provides the main relay drive signal in high condition for the main relay drive circuit 15, so that the main relay 19 continues to be turned on even if the ignition switch 17 is turned off. After that, the microcomputer 3 detects the turning-off of the ignition switch 17 based on the ignition switch signal, and switches the main relay drive signal from high to low after completion of the post-turn-off process that is executed posterior to the turning-off of the ignition switch 17. Then, the operation of the ECU 1 is stopped due to the shut off of the operation power caused by the turning-off of the main relay 19.

Also, in the ECU 1, the backup power circuit 11 generates and outputs a constant voltage V2 (e.g., 5V) as the back-up power to a particular part in the microcomputer 3 from the above-mentioned regular power source. The constant voltage V2 is provided for each of a back-up RAM (a random access memory (RAM) that is backed-up by continuous electricity supply: also designated as a standby RAM) in the microcomputer 3 and a buffer 21 to be mentioned later in a OR form.

Also, the microcomputer 3 communicates through the communication circuit 13 with the other equipment which is connected with a wiring 23 in the vehicle. Then, the wiring 23 has a scan tool 25 detachably connected thereto by a connector (not shown in the drawing) for diagnosis of the vehicle, that is, for diagnosing breakdown of the equipment in the vehicle.

The scan tool 25 is a handy device such as a combination of a microcomputer and a display unit, a small-volume personal computer or the like.

The microcomputer 3 has the following parts. That is,

- an engine control unit 31 for performing an engine control process,
- an I/O control unit 33 for performing a signal input/output process,
- a power control unit 35 for performing a signal output process that outputs a signal to the main relay drive circuit 15,
- a trouble detection unit 37 for performing a diagnosis process,
- a trouble information storage unit 39 for storing DTC that is indicative of a trouble diagnosed by the diagnosis process,
- a PDTC processor 41 for performing a write process that writes a predetermined number of DTCs stored in the trouble information storage unit 39 to the EEPROM 5 as PDTC, and a service processor 42 for performing a service process that communicates with the scan tool 25 through the communication circuit 13 and responds to a command from the scan tool 25.

Among the seven components described above, the components other than the trouble information storage unit 39 (i.e., the components 31, 33, 35, 37, 41, 43) are implemented as a functional unit that is realized by the execution of a program by a CPU (not shown in the drawing) in the microcomputer 3. Also, in the present embodiment, the trouble information storage unit 39 is a designated area in the back-up RAM.

Next, the processing which is performed by the microcomputer 3 is described.

Figure 2:
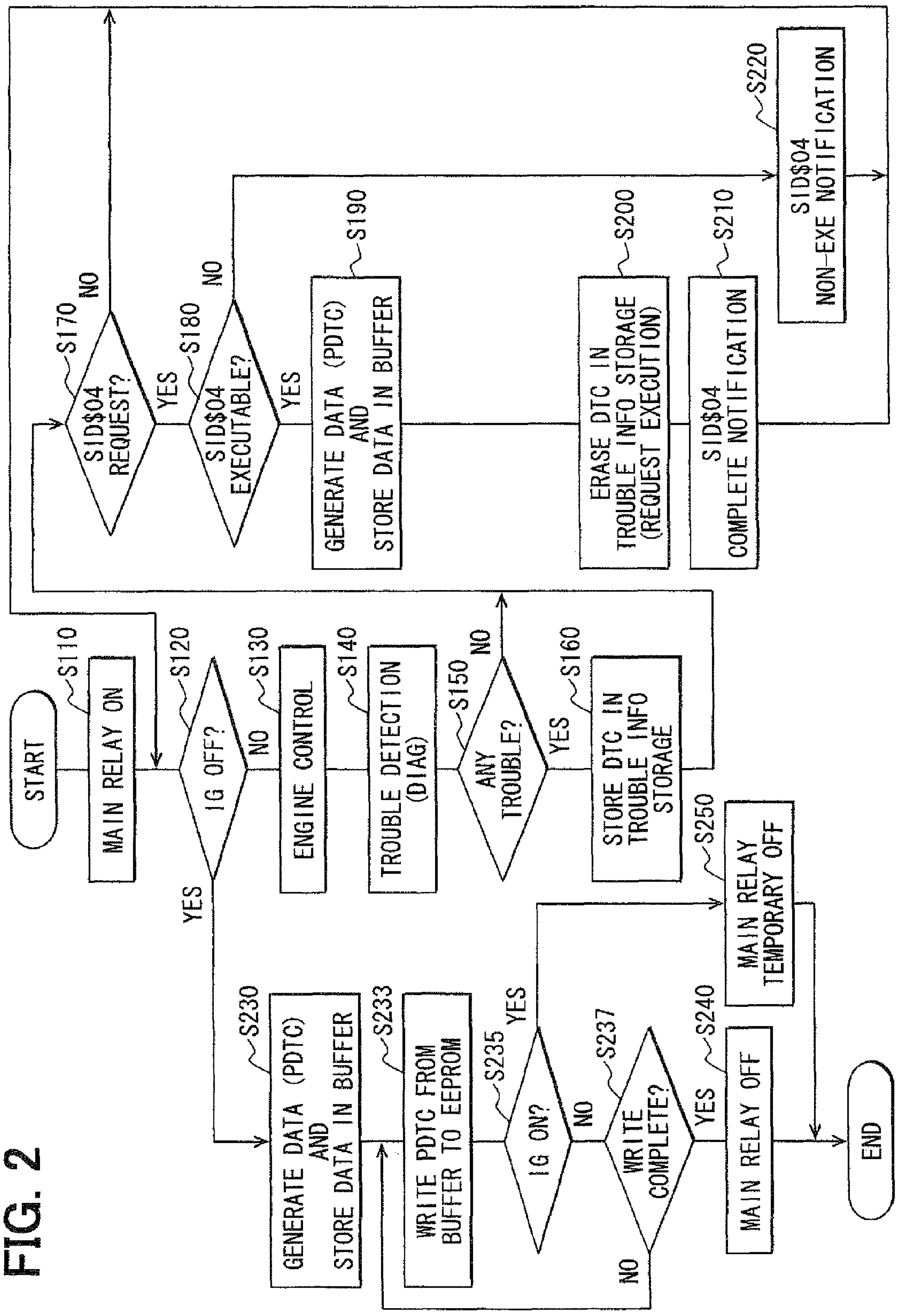
FIG. 2 is a flowchart of a process performed by a microcomputer in the embodiment of the present disclosure.

First, when the microcomputer 3 starts its operation with the turning-on of the ignition switch 17 as shown in a flowchart of FIG. 2, in S110, the microcomputer 3 makes, for the main relay drive circuit 15, the main relay drive signal to high, in order to secure the turn-on condition of the main relay 19.

Next, in S120, the process shown in FIG. 2 examines whether the ignition switch 17 is turned off. If the switch 17 is not turned off, the process proceeds to S130 for performing an engine control process.

Then, the process performs a diagnosis to detect a trouble in S140. This diagnosis processing is processing that determines if there is, in relevant components, a trouble by inputting signals from the I/O circuit 7 to various sensors and switches (so-called self-diagnosis processing), determining a trouble for multiple diagnosis items (i.e., abnormality detection items). For example, for determining a trouble of a certain sensor, the process performs a diagnosis that examines its output value relative to a certain value range, leading to a determination that the certain sensor is abnormal (i.e., having a trouble) if the output value exceeds the certain range. The diagnosis is performed for only once during a turning-on of the ignition switch 17 for certain diagnosis items, or is performed for multiple times during the turning-on of the switch 17 for other diagnosis items.

Next, in S150, the process determines whether there is a diagnosis item that detects a trouble in S140 process, and the process proceeds to S170 if there is no diagnosis item that detects a trouble.

If there is a trouble detected in S150 (S150: YES), the process proceeds to S160, and stores a DTC that corresponds to the trouble currently being detected (i.e., a DTC that represents the currently detected trouble) in the trouble information storage unit 39. Then, the process proceeds to S170.

In S170, whether or not a DTC erasure request command is received from scan tool 25 is determined. The DTC erasure request command is a command which requests to erase a DTC in the trouble information storage unit 39. More practically, the command has a code "SID$04." In this case, the character '$' is an indicator that means that the following number is in a hexadecimal format.

Then, if the DTC erasure request command is not received, the process returns to S120. If the erasure request command is received, the process proceeds to S180.

In S180, the process determines whether or not the process of the DTC erasure request command is in the executable condition (i.e., processing which erases DTC in the trouble information storage unit 39). For example, the process determines whether both of the speed and the engine rotation number are equal to 0. This is because, if the DTC in the trouble information storage unit 39 is erased during the travel of the vehicle or during the operation of the engine, fail-safe operation based on the erased DTC becomes non-performable, thereby putting the vehicle in a non-preferable condition.

If the DTC erasure request command is in the executable condition, the process proceeds to S190.

The process then generates data which should be written in the EEPROM 5 as PDTC from the data (DTC) in the trouble information storage unit 39, and the process writes the generated data in the buffer 21 in S190. More practically, from among the DTCs in the storage unit 39, a DTC that is not stored as the PDTC in the EEPROM 5 (i.e., the DTC fulfilling a preservation condition) is selected, and the selected DTC is, if any, copied to the buffer 21 from the storage unit 39 as the data to be written to the EEPROM 5.

Then, in S200, a process corresponding to the DTC erasure request is performed (i.e., a process indicated by the erasure request command). That is, the process erases the OTC in the trouble information storage unit 39. Then, the process provides a complete notification that notifies a completion of the process corresponding to the DTC erasure request command to the scan tool 25 in S210, and then the process returns to S120.

The process proceeds to S220, if, in S180 described above, it is determined that the DTC erasure request command is not in the executable condition. The process then notifies to the scan tool 25 a non-execution notification that the process corresponding to the DTC erasure request command is not performed. The process then returns to S120.

On the other hand, when the ignition switch 17 is determined to have been turned off in S120, the process proceeds to S230 and performs the same processing as the one in the above-mentioned S190.

Next, a PDTC write process to write a DTC in the buffer 21 to the EEPROM 5 as a PDTC starts in S233. In the present embodiment, a maximum of four PDTC can be written in a vacant PDTC storage area of the EEPROM 5. The PDTC write process writes the DTC currently in the buffer 21 according to a predetermined order such as a buffer storage order in the buffer 21, a reversed buffer storage order, a trouble detection time order, a reversed trouble detection time order, or the like. Further, in S190 and S230, the DTC may not be stored in the buffer 21 if, by examining the number of the DTCs currently storable as PDTC in the available PDTC storage areas of the EEPROM 5, the number of storable DTC exceeds the number of available PDTC storage areas.

Then, the process performed in parallel with the PDTC write process determines whether or not the ignition switch 17 is turned on in S235, and, if the switch 17 is not turned on, the process determines, in S237, the PDTC write process has completed. Then, if the write process has not yet completed, the process returns to S233, and continues the execution of the PDTC write process.

Also, if the PDTC write process is determined to be complete in S237, the process proceeds to S240, and makes the main relay drive signal to the main relay drive circuit 15 low for finishing all processing. Then, the main relay 19 is turned off, and the operation power for the ECU 1 is cut off.

On the other hand, if the ignition switch 17 is determined to be turned on, that is, if the switch 17 is turned on during the PDTC write process, the PDTC write process is interrupted and the process proceeds to S250.

Then, in S250, the process makes the main relay drive signal to the main relay drive circuit 15 low, and outputs the above-mentioned compulsive blocking-off signal to the main relay drive circuit 15. Then, the process finishes all processing. Then, even if the ignition switch 17 is being turned on, the main relay 19 is temporarily turned off for a certain period of time, before the restart of the ECU 1. In case, as described above, the restart due to the compulsive blocking-off is performed, the contents of the volatile memory in the microcomputer 3 other than the back-up RAM and the buffer 21 are erased. That is, the contents of the volatile memory such as a normal RAM or the like that does not have the supply of the back up electricity (i.e., the constant voltage V2) from the backup power circuit 11 are erased.

In the following, the operation of above-mentioned the ECU 1 is described.

First, if the trouble is detected by the diagnosis (S140) while the ignition switch 17 is turned on (S150: YES), the DTC which shows the detected trouble is stored in the trouble information storage unit 39 (S160).

Then, after turning off of the ignition switch 17, from among the DTCs stored in the trouble information storage unit 39, the DTC to be stored in the EEPROM 5 as the PDTC is selected and stored in the buffer 21 (S230), and the selected DTC in the buffer 21 is written in the EEPROM 5 as the PDTC (S233).

In this case, the DTC in the trouble information storage unit 39 can be retrieved to the scan tool 25 in response to the DTC read request command from the tool 25. In the same manner, the PDTC in the EEPROM 5 can be retrieved to the scan tool 25 in response to the PDTC read request command from the tool 25.

In other words, the microcomputer 3 performs a process that transmits the DTC stored in the trouble information storage unit 39 to the scan tool 25 upon receiving the DTC read request command from the tool 25, or performs a process that transmits the PDTC stored in the EEPROM 5 to the scan tool 25 upon receiving the DTC read request command from the tool 25. Then, the scan tool 25 displays the retrieved DTC or PDTC from the ECU 1 on the display unit of the scan tool 25.

Further, the ECU 1 erases the DTC in the trouble information storage unit 39 (S200), if the DTC erasure request command is in the executable condition (S180: YES) after receiving the command from the scan tool 25 (S170: YES). However, in the above process, the DTC to be stored in the EEPROM 5 as the PDTC is selected from among the DTCs in the trouble information storage unit 39 before erasing the DTC therefrom. The selected DTC is stored in the buffer 21 (S190). This operation scheme is same as the one performed after turning off of the ignition switch 17.

Therefore, if the DTC in the trouble information storage unit 39 has been erased at the time of turning off of the ignition switch 17 after the selection and storage described above, the buffer 21 already has the DTC that is to be stored in the EEPROM 5 as the PDTC stored therein. Therefore, the PDTC write process in S233 can write, to the EEPROM 5 as the PDTC, the DTC in the buffer 21 that is stored upon receiving the DTC erasure request command. As a result, the storage of the PDTC to the EEPROM 5 is performed even when the DTC erasure request command is received from the scan tool 25.

That is, if the process in S190 is not performed in case that the DTC in the trouble information storage unit 39 is erased upon receiving the DTC erasure request command, the erased DTC can not be stored in the EEPROM 5 as the PDTC, unless the same erased DTC is stored again in the trouble information storage unit 39 before the ignition switch 17 is turned on again (i.e., unless the same trouble represented by the erased DTC is detected again). However, according to the operation scheme of the present embodiment, the above-described problem is solved.

Further, the buffer 21 may be implemented as a volatile memory that is not backed up by the supply of the backup power. However, in the present embodiment, the buffer 21 is backed up by the supply of the backup power having the constant voltage V2, the DTC in the buffer is preserved even when the operation power of the ECU 1 is inadvertently terminated before the writing of the DTC from the buffer 21 to the EEPROM 5 is finished. Therefore, the loss of the DTC that should be stored in the EEPROM 5 is securely prevented.

For example, during the write process of the DTC from the buffer 21 to the EEPROM 5 as the PDTC after the turning-off of the ignition switch 17, the restart of the ECU 1 accompanied by the temporary shut-off of the operation power due to the turning-on of the ignition switch 17 does not lead to the loss of the DTC from the buffer 21, thereby enabling the writing of the DTC to the EEPROM 5 as the PDTC at the next turning-off of the ignition switch 17.

In the first embodiment, the processing in S140 to S160 corresponds to a diagnosis unit, and processing of S190 and S230 corresponds to an information selection unit in the claim language. Further, the scan tool 25 corresponds to "from outside of the electronic control device," and the DTC erasure request command corresponds to a specific command in the claim language. Furthermore, the buffer 21 also corresponds to, in the claim language (e.g., claims 5, 6), a record unit, contents of which are not erased by the processing indicated by the specific command.

Second Embodiment

However, the following problem may persist in the above embodiment. That is, even when the memory (i.e., the buffer 21) having a backup power supply is used, the DTC in the buffer 21 to be stored in the EEPROM 5 may be lost due to the restart of the ECU 1 that has a temporary shut off of the power source, for example, during the PDTC write process posterior to the turning off of the ignition switch 17, in case that the backup power supply itself is not working properly or having a trouble.

Figure 3:
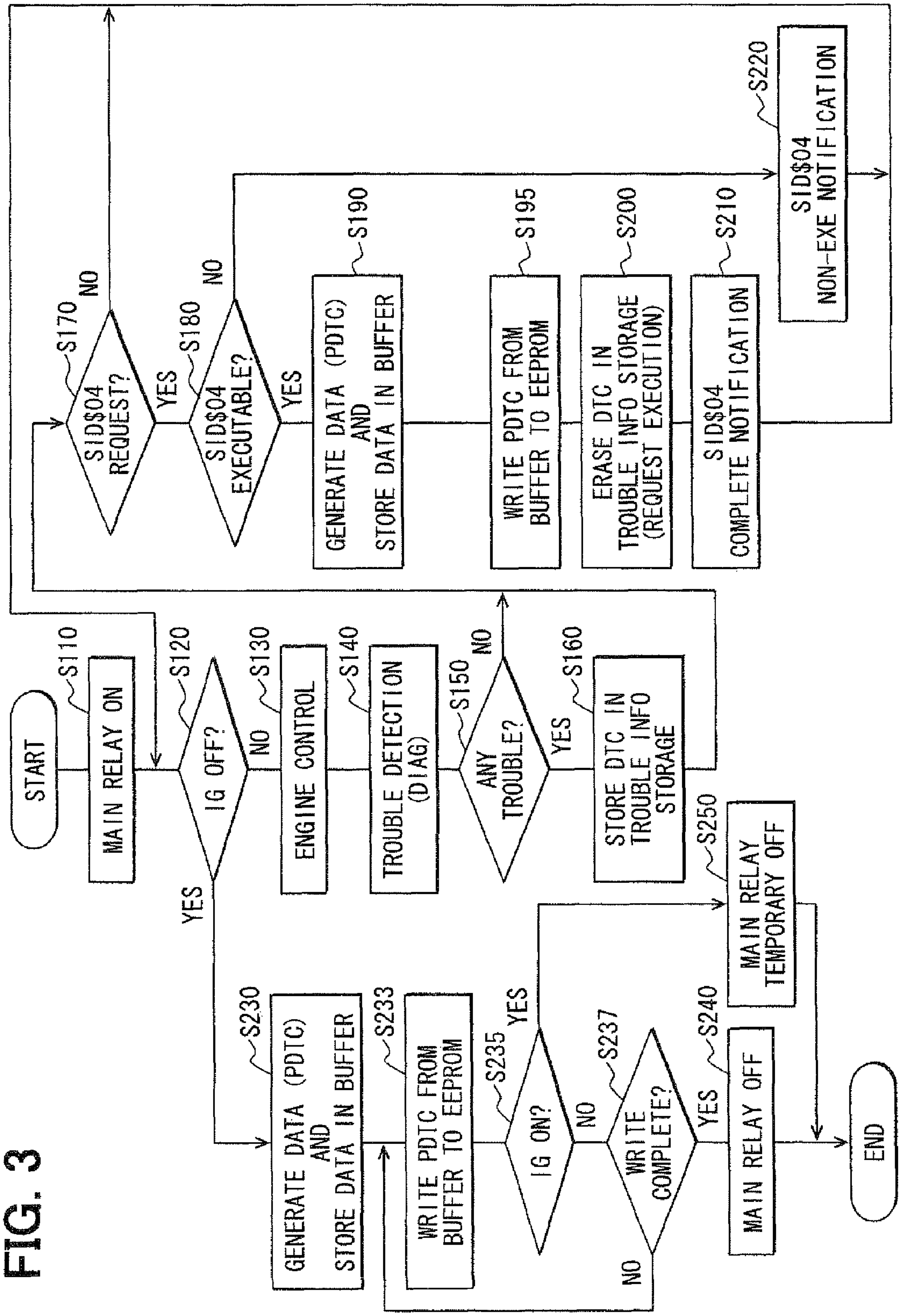
FIG. 3 is a flowchart of a process performed by a microcomputer in another embodiment of the present disclosure.

Therefore, in the ECU 1 of the second embodiment, the microcomputer 3 performs a process shown in FIG. 3, instead of the process in FIG. 2. The process in FIG. 3 has an additional step of S195 in comparison to the process in FIG. 2.

That is, as for the second embodiment, after processing S190, the process proceeds to S195, wherein the microcomputer 3 performs the same PDTC write process as S233, and then the process proceeds to S200.

In other words, in the second embodiment, not only the first DTC write process that writes, to the buffer 21 as the PDTC, the DTC being selected from among the DTCs in the trouble information storage unit 39, but also the second DTC write process that writes the DTC in the buffer 21 to the EEPROM 5 as the PDTC are performed prior to the erasure of the DTC in the trouble information storage unit 39 when the DTC erasure request command is received.

Therefore, the ECU 1 in the second embodiment does not lose the DTC that should be stored in the EEPROM 5 as the PDTC even when the backup power circuit 11 is not working properly.

That is, as for the present embodiment, the buffer 21 may be implemented as a volatile memory that does not have a backup power supply. Further, in the present embodiment, the EEPROM 5 corresponds to a record unit in the claim language (e.g., claim 7).

Third Embodiment

The EEPROM has, generally, a longer write time in comparison to the other type memory such as the RAM and the like. Therefore, the data writing to the EEPROM may preferably be performed only after the turning off of the ignition switch 17.

Figure 4:
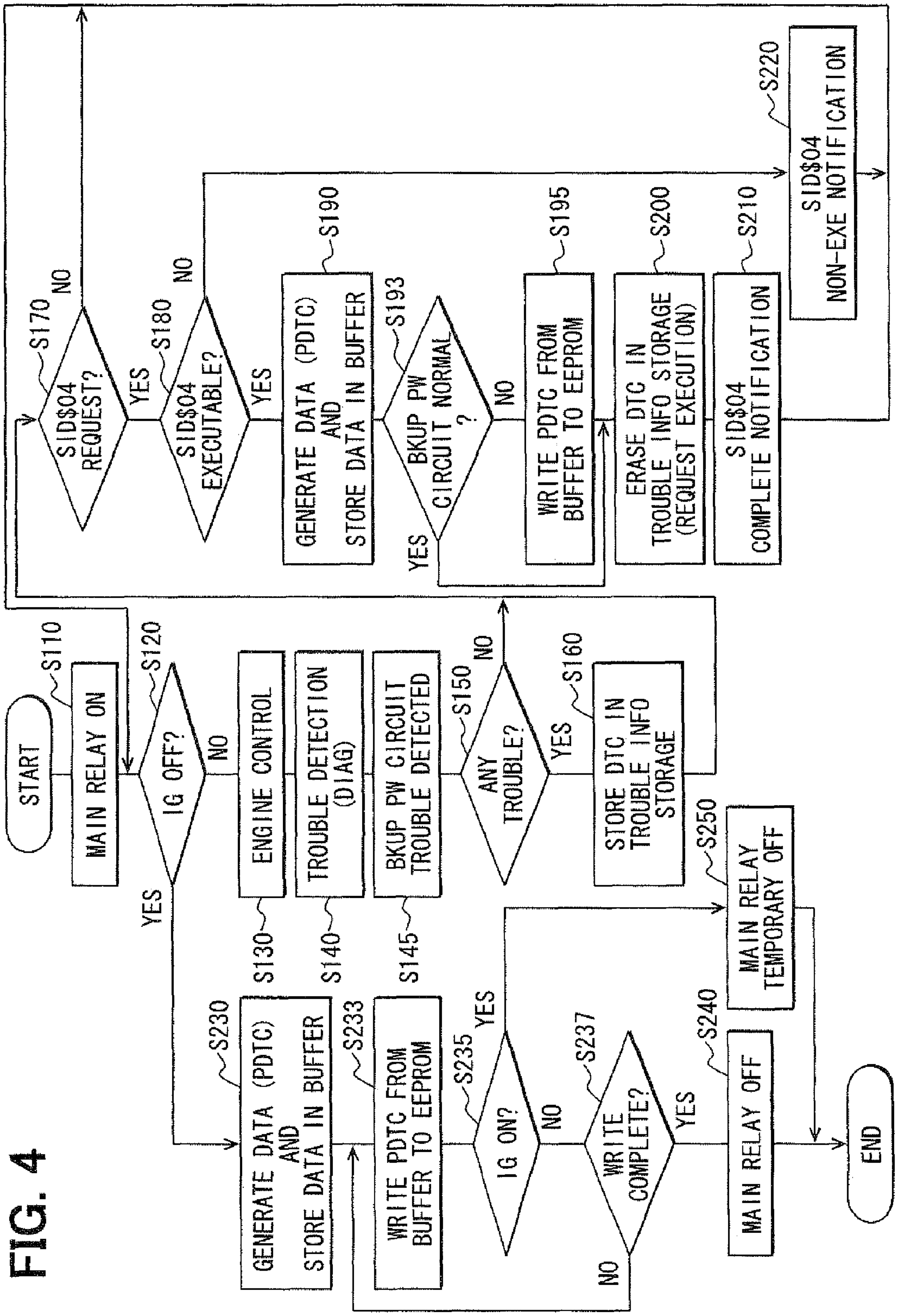
FIG. 4 is a flowchart of a process performed by a microcomputer in yet another embodiment of the present disclosure.

Therefore, in the ECU 1 of the third embodiment, the microcomputer 3 performs a process in FIG. 4 instead of the process in FIG. 3. The process in FIG. 4 has an additional step of S145 and S193 to the process in FIG. 3.

That is, in the present embodiment, the microcomputer 3 performs S145 after processing S140 for detecting abnormality of the backup power circuit 11. More practically, the process performs an A/D conversion of the constant voltage V2 to detect the voltage value, and, then proceeds to S150.

Further, the process in the microcomputer 3 determines whether or not the backup power circuit 11 is normal by referring to the detection result in S145, after processing S190 to proceed to S193.

Then, if the backup power circuit 11 is not normal (if it is abnormal), the process proceeds to S195 for performing the PDTC write process before proceeding to S200. Alternatively, if the power circuit 11 is normal, the process proceeds to S200 without taking S195.

In other words, the present embodiment uses the following operation scheme. That is, prior to the erasure of the DTC in the trouble information storage unit 39 after receiving the DTC erasure request command, (a) if the backup power circuit 11 is normal, S195 is skipped, and the DTC to be stored as the PDTC is preserved only in the buffer 21, which is written from the buffer 21 to the EEPROM 5 after turning off of the ignition switch 17, in the same manner as the first embodiment (see FIG. 2), or (b) if the backup power circuit 11 is not normal, the process in S195 is performed, that is, the DTC stored in the buffer 21 is simultaneously stored in the EEPROM 5, in the same manner as the second embodiment (see FIG. 3).

Therefore, it is possible to achieve both of the two advantageous effects at the same time. That is, in the present embodiment, the loss of the DTC to be stored in the EEPROM 5 is securely prevented, and, at the same time, the DTC write process that writes the DTC to the EEPROM 5 is performed only after the turning off of the ignition switch 17 as much as possible.

Further, in the present embodiment, the backup power circuit 11 corresponds to a back-up power supply unit in the claim language. The process in S190, S195 in addition to the process in S230, S233, corresponds to an information selection unit in the claim language (e.g., claim 9).

Other Embodiments

Although the present disclosure has been fully described in connection with the preferred embodiments thereof with reference to the accompanying drawings, it is to be noted that various changes and modifications will become apparent to those skilled in the art.

For example, the second embodiment may be modified in the following manner. That is, S190 may be replaced with S191, for storing all of the DTCs in the trouble information storage unit 39 to the buffer 21, and S230 may be replaced with S231, for selecting, from among all of the DTCs in both of the trouble information storage unit 39 and the buffer 21, the DTC that is not stored as PDTC in the EEPROM 5, and for updating the DTC in the buffer 21, as shown in FIG. 5.

Further, the third embodiment may be modified in the following manner. That is, S190 may be replaced with S191, S230 may be replaced with S231, and S195 may be replaced with S196, for selecting, from among the DTCs stored in the trouble information storage unit 39 or in the buffer 21, the DTC that is not stored as the PDTC in the EEPROM 5, and for writing the selected DTC to the EEPROM 5.

Figure 5:
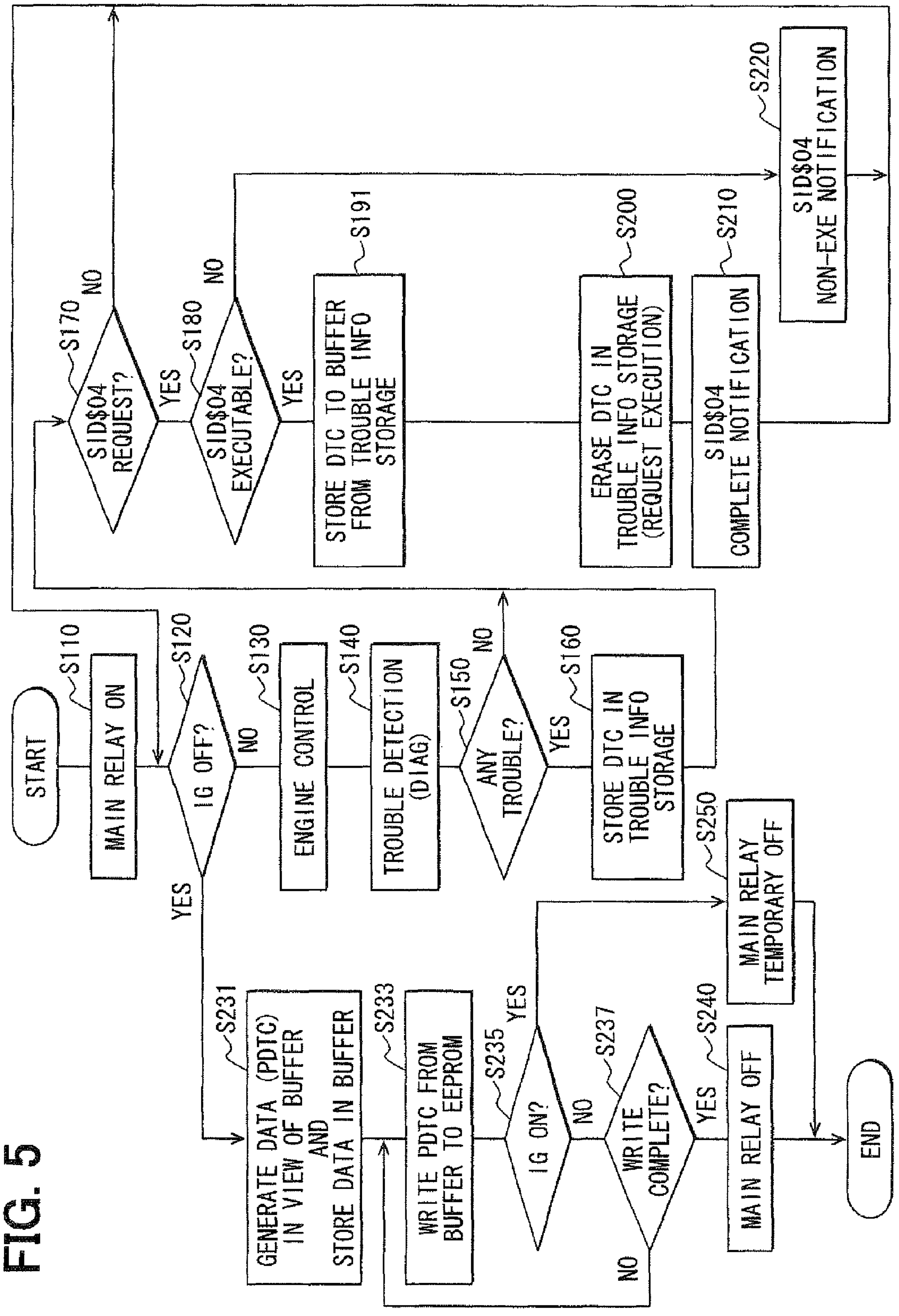
FIG. 5 is a modification of the flowchart shown in FIG. 2.
Figure 6:
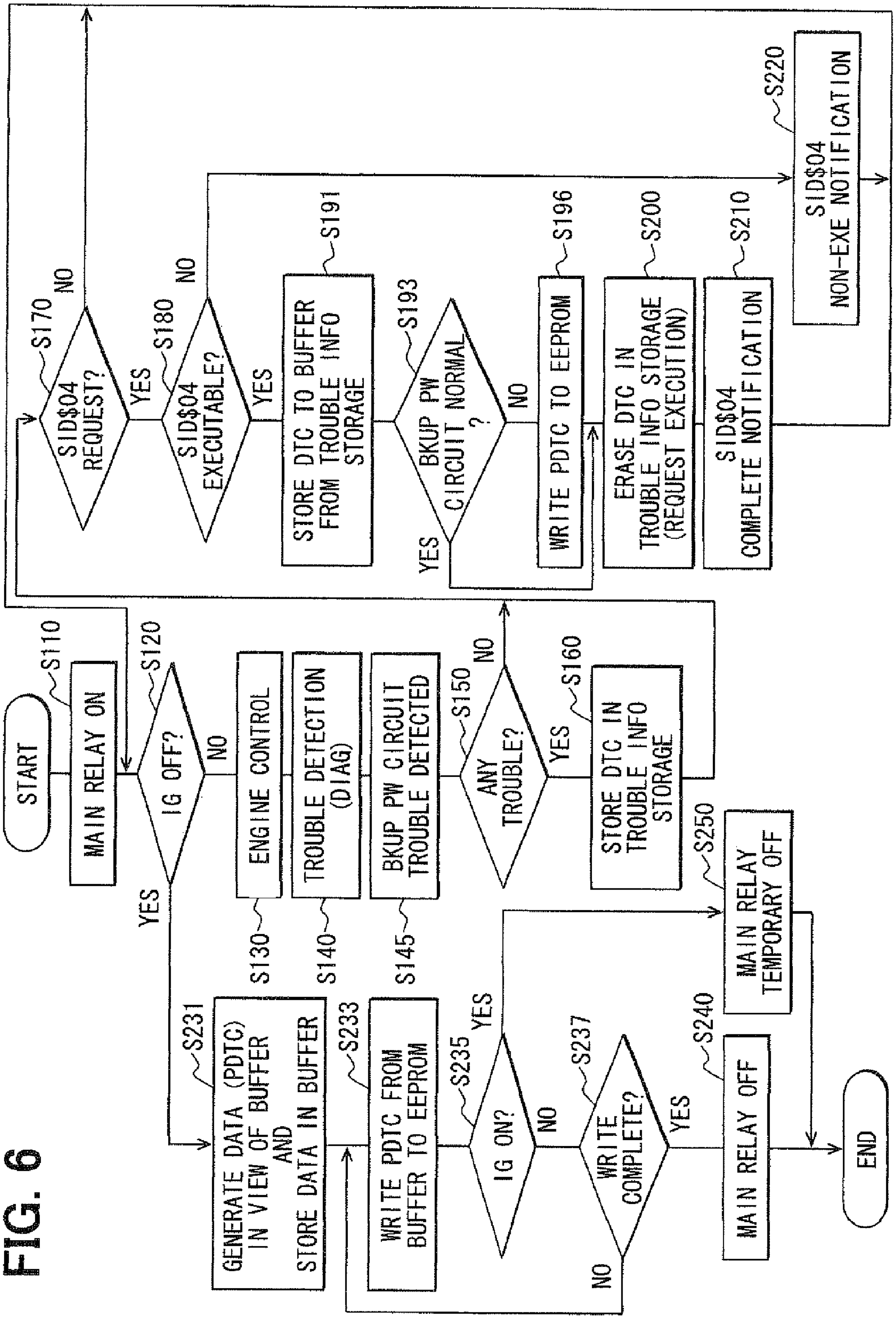
FIG. 6 is a modification of the flowchart shown in FIG. 4.

Furthermore, in S191 in FIG. 5 and FIG. 6, only the DTC that is not stored as the PDTC in the EEPROM 5 may be stored, from among the DTCs in the trouble information storage unit 39, in the buffer 21.

Further, the rewritable non-volatile memory may be implemented not only as the EEPROM but also as the flash ROM. Further, the trouble information storage unit 39 may be implemented as a RAM that is not backed up by the backup power supply.

Further, the specific command that indicates a process for erasing the trouble information in the trouble information storage unit may not be limited to the command that requests the erasure of the trouble information (i.e., the DTC erasure request command).

For example, in case that the RAM without having the backup power supply is used as the trouble information storage unit 39 and the backup RAM having the backup power supply is used as the buffer 21, the specific command may be a reset request command that requests a restart of the ECU 1 by temporarily shutting the power supply for the ECU 1. If the reset request command is used, the microcomputer 3 may perform the following process in the flowcharts shown in FIGS. 2 to 6. That is, in S170, the reception of the reset request command is determined, in S180, the executability of the reset request command is determined, and, in S200, the main relay drive signal for the main relay drive circuit 15 is made to have a low level, and the compulsive blocking-off signal is output to the main relay drive circuit 15, in response to the reset request signal. This operation scheme is used because, even when the ignition switch 17 is being turned on, as mentioned before, the main relay 19 may be turned off to cause the restart of the ECU 1. Further, if the restart is caused, the memorized contents of the buffer 21 are not erased due to the supply of the backup power.

Further, the process in S210 may be performed prior to S190 (or S191) and S200, or may be performed in parallel with the process of S190 (S191)/S200.

In the above embodiments, the trouble diagnosis is performed during the "ON" time of the ignition switch. However, the diagnosis performed in a different manner may be assumed to be in the scope of the present disclosure. That is, in the leakage diagnosis of the piping that connects the fuel tank with the intake manifold for conveying fuel gas for example, the main relay may be operated by the power supply after a certain period from the turning off of the ignition switch, for the purpose of leakage diagnosis. In that case, the trouble information is stored in the backup RAM for example, and the trouble information is then stored as the PDTC in the non-volatile memory during the control of the main relay at a certain timing in association with the turning off of the ignition switch.

Further, the storage of the DTC to the non-volatile memory may be performed in a certain condition that is different from the fulfillment of the PDTC requirement by the DTC being memorized in the backup RAM. Therefore, the trouble information stored or copied to the non-volatile memory may not necessarily be the trouble information fulfilling the PDTC requirement.

Such changes, modifications, and summarized scheme are to be understood as being within the scope of the present disclosure as defined by appended claims.

What is claimed is:

1. An electronic control device capable of performing processing indicated by a command when receiving the command from outside of the electronic control device, the device comprising:

a diagnosis unit for performing diagnosis of at least one diagnosis item while energized and for storing, to a trouble information storage, a diagnostic trouble code (DTC) indicative of a trouble detected by the diagnosis;

a non-volatile memory that is capable of storing data in a re-writable manner;

an information selection unit for selecting, from among DTCs in the trouble information storage, DTC to be saved in the non-volatile memory as a permanent diagnostic trouble code (PDTC) based on a save criterion and storing the DTC selected in a buffer as a PDTC; and a trouble information preservation unit for performing preservation of the DTC by writing the PDTC stored in the buffer into the non-volatile memory after a turning-off of an ignition switch of a vehicle or upon receiving a command from outside of the device, wherein the trouble information preservation unit causes the information selection unit to select the DTC prior to performing processing indicated by the received command whenever the received command is a specific command that indicates erasure of the DTC from the trouble information storage.

2. The electronic control device of claim 1, wherein the buffer is a memory that is backed up by a supply of a back-up power.

3. The electronic control device of claim 1, wherein, when the specific command is received, the information selection is operated and the PDTC in the buffer is written in the non-volatile memory.

4. The electronic control device of claim 2, wherein, when the specific command is received, an integrity of a back-up power supply unit for supplying the back-up power for the buffer is determined, and when the back-up power supply unit is not determined as integral, the information selection unit is operated and the PDTC in the buffer is written in the non-volatile memory.

5. An electronic control device capable of performing processing indicated by a command when receiving the command from outside of the electronic control device, the device comprising:

a diagnosis unit for performing diagnosis of at least one diagnosis item while energized and for storing, to a trouble information storage, a diagnostic trouble code (DTC) indicative of a trouble detected by the diagnosis;

a non-volatile memory that is capable of storing data in a re-writable manner; and an information selection unit for selecting, from among DTCs in the trouble information storage, DTC that fulfills a save criterion for storing the information in the non-volatile memory and writing the DTC selected in the non-volatile memory, as a permanent diagnostic trouble code (PDTC), wherein, when a specific command for instructing erasure of the DTC in the trouble information storage is received from outside of the device, at least the DTC fulfilling the save criterion is recorded in a record unit as a DTC, contents of which is not erased by the processing indicated by the specific command, before performing the processing indicated by the specific command.

6. The electronic control device of claim 5, wherein the record unit is a memory that has a supply of a back-up power.

7. The electronic control device of claim 5, wherein the record unit is the non-volatile memory, and when the specific command is received, the DTC fulfilling the save criterion in the trouble information storage is stored in the non-volatile memory as a PDTC, before performing the processing indicated by the specific command.

8. The electronic control device of claim 6, wherein when the specific command is received, an integrity of the back-up power supply unit for supplying the back-up power for the record unit is determined, when the back-up power supply unit is determined as integral, the DTC at least fulfilling the save criterion in the trouble information storage is written in the record unit as a PDTC from among the DTC, in the trouble information storage, and when the back-up power supply unit is not determined as integral, the DTC fulfilling the save criterion in the trouble information storage is written in the record unit as a PDTC from among the DTC in the trouble information storage.

9. An electronic control device capable of performing processing indicated by a command when receiving the command from outside of the electronic control device, the device comprising:

a diagnosis unit for performing diagnosis of at least one diagnosis item while energized and for storing, to a trouble information storage, a diagnostic trouble code (DTC) indicative of a trouble detected by the diagnosis;

a non-volatile memory that is capable of storing data in a re-writable manner; and an information selection unit for selecting, from among DTCs in the trouble information storage, at least one entry of DTC to be saved in the non-volatile memory as a permanent diagnostic trouble code (PDTC), wherein, when a specific command for performing processing that instructs erasure of the DTC in the trouble information storage is received from outside of the device, the processing indicated by the specific command is performed after the information selection unit is operated.

10. The electronic control device of claim 9, wherein the specific command is a reset request command for the electronic control device.

* * * * *